Dec. 15, 1936.　　　A. P. THOMAS　　　2,064,578
BRAKE
Filed April 13, 1935　　　2 Sheets-Sheet 1
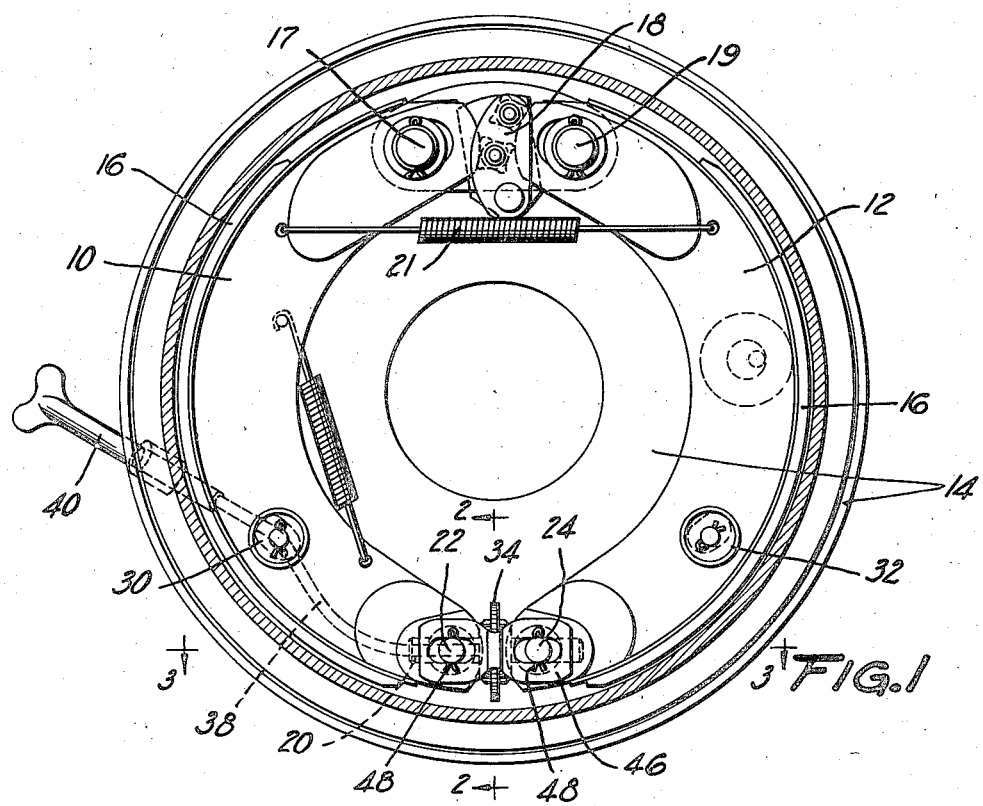
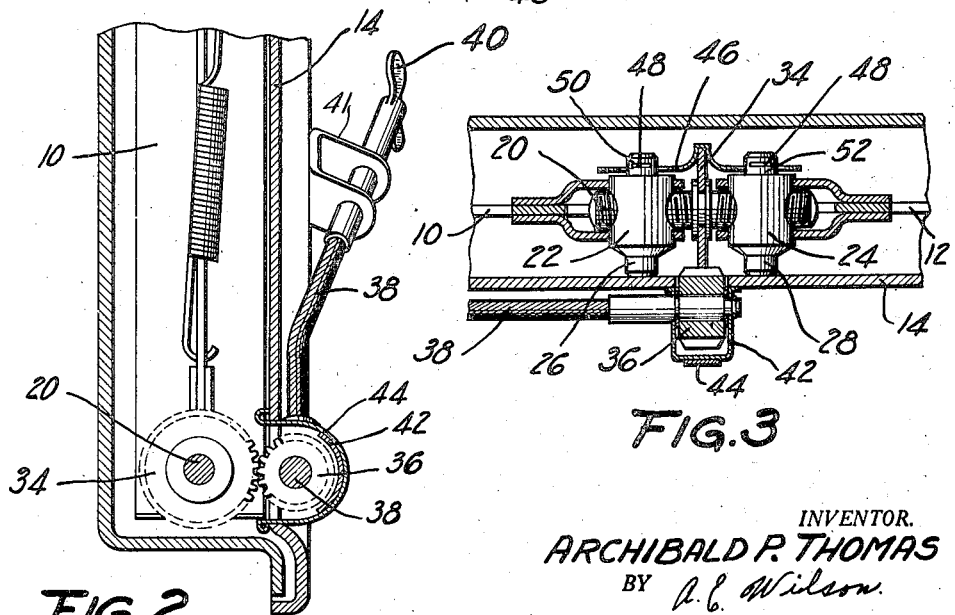
INVENTOR.
ARCHIBALD P. THOMAS
BY A. C. Wilson.
ATTORNEY Dec. 15, 1936.    A. P. THOMAS    2,064,578
BRAKE
Filed April 13, 1935    2 Sheets-Sheet 2

INVENTOR.
ARCHIBALD P. THOMAS
BY A. E. Wilson
ATTORNEY

Patented Dec. 15, 1936

2,064,578

UNITED STATES PATENT OFFICE 2,064,578

BRAKE

Archibald Percy Thomas, Birmingham, England, assignor to Bendix Aviation Corporation, South Bend, Ind., a corporation of Delaware Application April 13, 1935, Serial No. 16,114
In Great Britain October 27, 1930

19 Claims. (Cl. 188—79.5)

This invention relates to brakes and more particularly to improvements in vehicle brakes of the type in which a plurality of brake shoes are adapted to be urged into contact with a brake drum fixed to a wheel to effect deceleration of the vehicle. The shoes are adapted to be urged into contact with the drum by means of a cam or other actuating mechanism adapted to apply the brake.

The brake shoes are normally connected at a point remote from the actuating mechanism. It is desirable to provide means for varying the space between the brake shoes at this point to compensate for variations in the effective length of the friction material carried by the brake shoes when the friction material becomes worn due to service. In this type of brake this connection between the brake shoes often has a limited circumferential movement relative to a fixed backing plate upon actuation of the brake. It is therefore difficult to interconnect the brake shoes in such a manner that adjustments can be easily and quickly made.

The object of this invention is to provide means whereby the brake shoes may be quickly and accurately adjusted with a minimum of effort.

According to one preferred embodiment of the invention a turnbuckle or right-and-left-hand threaded connector having a toothed wheel meshing with a second toothed wheel, and rotatable by means such as a flexible shaft having a suitable handle, is operable to accurately adjust the position of the shoes with reference to each other.

In another desirable embodiment of the invention the entire actuating mechanism with the exception of the handle is enclosed within the brake drum to protect it from the elements.

Another important feature of the invention is the provision of a novel saddle arranged in an improved manner to guide the adjusting turnbuckle and to move relative to the backing plate as the shoes move.

Other features and advantages of this invention will be apparent from the following detailed description, together with the accompanying drawings submitted for purposes of illustration only and not intended to define the scope of the invention, reference being had for that purpose to the subjoined claims.

In the drawings, wherein similar reference characters refer to similar parts throughout the several views:

Figure 1 is a vertical section of a brake showing the shoes and the adjusting means;

Figure 2 is a sectional view taken on the line 2—2 of Figure 1;

Figure 3 is a sectional view taken on the line 3—3 of Figure 1;

Figure 4:
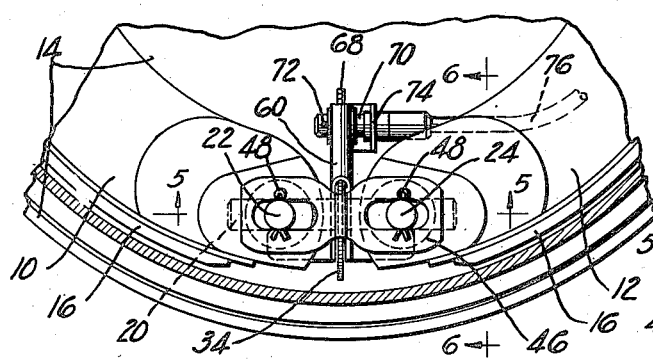
Figure 4 is a vertical section showing a modified form of adjusting means.

Referring to the drawings, and more particularly to Figure 1, there is shown a vehicle brake having brake shoes 10 and 12 mounted on a backing plate 14. The shoes are mounted in such a manner as to have limited circumferential movement relative to the backing plate and are provided with friction lining 16. The upper ends of the shoes are slotted to embrace fixed anchors 17 and 19, one of which takes the braking torque when the drum is turning in one direction and the other of which takes the torque when the drum is turning in the other direction. The brake shoes 10 and 12 are adapted to be separated by a cam 18 against the resistance of a return spring 21 to apply the brakes. The illustrated cam is more fully described in Lauer Reissue Patent No. 18,966. An auxiliary spring 23 urges the shoes upwardly toward the anchors.

The opposite ends of the shoes 10 and 12 are interconnected by means of a turnbuckle or adjusting screw 20 having oppositely turned right and left threaded portions engaged within the threaded bores of members 22 and 24, carried by the bifurcated ends of the shoes 10 and 12. The members 22 and 24 have portions 26 and 28 slidably contacting the backing plate 14 and cooperating with the steady rests 30 and 32 to confine the shoes laterally.

The adjusting screw 20 is provided with means such as a toothed wheel 34 to facilitate the rotation thereof to move the ends of the shoes 10 and 12 toward or away from each other to adjust the clearance between the peripheral surfaces of the shoes and the brake drum in the embodiment of Figures 1 and 2, a toothed driving pinion 36, projecting through an aperture formed in the backing plate 14, meshes with the toothed wheel 34 fixed to the adjusting screw 20 to facilitate the actuation of the adjusting screw. The driving pinion 36 is provided with a flexible shaft 38 having a handle 40 fixed thereto and mounted on the backing plate 14 in any convenient position. The handle may be supported in a U-shaped stamped bracket 41 mounted on the backing plate with the legs of the U projecting outwardly and pierced to provide spaced bearings for the shaft of the handle.

The driving pinion 36 is mounted within a small housing 42 held in position against the side walls of the aperture by a spring clip 44 encircling the housing and provided with crimped ends engaging the inside of the aperture. The driving pinion 36 is thus protected from the elements.

The axis of the driving pinion 36 is at right angles to a radius of the backing plate 14, passing through the toothed wheel 34, so that limited circumferential or floating movement of the shoes 10 and 12 can be provided for by making the teeth of the driving pinion 36 of substantial length axially as shown in Figure 3. The toothed wheel 34 will therefore always be in mesh with the driving pinion 36 in all positions to which the adjusting screw 20 can move during the actuation of the brake.

The toothed wheel 34 is normally prevented from rotating by a spring clip 46 engaging the teeth of the wheel 34 and confined by the pins 48 in slots provided in the extensions 50 and 52 carried by the members 22 and 24 respectively. The toothed wheel 34 can, however, be actuated against the resistance of the spring clip 46 by the driving pinion 36.

Means are thus provided for accurately adjusting the brakes with the minimum effort.

In Figures 4–7 a modified form of control mechanism is shown wherein a sheet metal stamping or saddle 60 (Figure 7) is adapted to fit as a yoke over the toothed wheel 34.

The yoke 60 is provided with parallel side members 62 and 64 having slots 66 to receive the adjusting screw 20. The toothed wheel 34, carried by the adjusting screw 20, is thus rotatably mounted between the side members 62 and 64.

The wheel 34 is adapted to be rotated by a driving pinion 68 splined or otherwise keyed to a short rigid spindle 70 rotatably mounted between the side members 62 and 64. The spindle 70 is held in place by a split pin 72 at one end and is supported by a flange 74 carried by the side member 62. The other end of the spindle 70 is fixed to a flexible shaft 76 operably connected to a cylindrical member 78 (Figure 8) rotatably mounted in an inclined bracket 80 on the backing plate 14. The end of the cylindrical member 78 is provided with a handle 82 by which it may be rotated to move the ends of the shoes 10 and 12 to any desired position to effect the adjustment of the brake.

The side member 64 is provided with a foot 84 designed to engage the backing plate 14 to prevent rotation of the yoke 60 about an axis perpendicular to the spindle 70 upon actuation of the adjusting mechanism. Rotation about an axis parallel to the axis of the spindle 70 is prevented by the spaced lugs 86 and 88 carried by the parallel side members 62 and 64 of the yoke 60 and slidably resting against the threaded members 22 and 24.

The length of the flexible shaft 76 is such that it does not impede the limited circumferential movement of the shoes 10 and 12 relative to the backing plate 14. By removing the split pin 72 at the inner end of the spindle 70, the complete shaft may be removed bodily.

Figure 6:
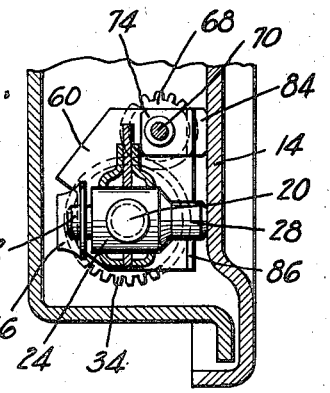
Figure 6 is a sectional view on the line 6—6 of Figure 4.
Figure 5:
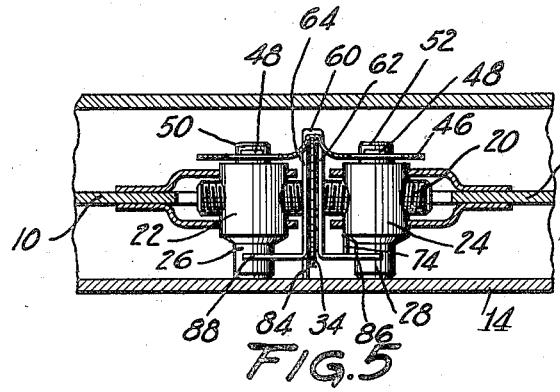
Figure 5 is a sectional view on the line 5—5 of Figure 4.
Figure 7:
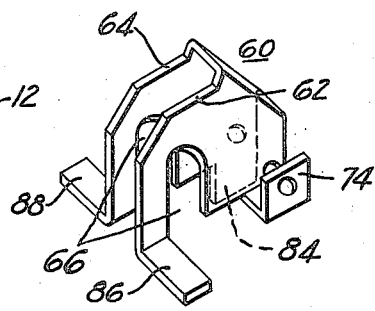
Figure 7 is a perspective view of the saddle shown in Figure 4.
Figure 8:
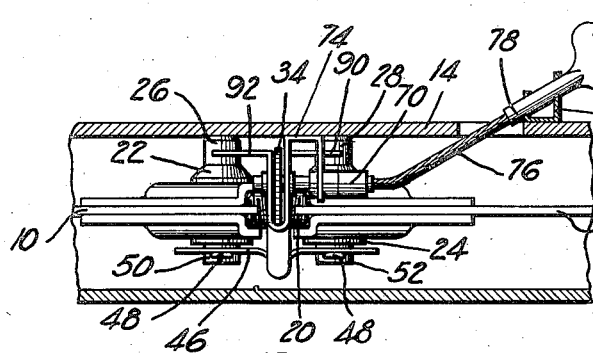
Figure 8 is a lower plan view showing a modified form of adjusting means.
Figure 9:
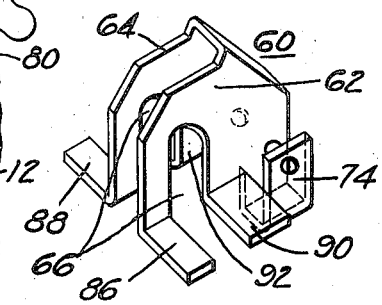
Figure 9 is a perspective view, similar to Figure 7, showing a modified form of the saddle.

In the modification shown in Figures 8 and 9, a pair of spaced lugs 90 and 92, carried by the side members 62 and 64, operate to prevent rotation of the yoke 60 about an axis perpendicular to the spindle 70 upon actuation of the adjusting mechanism rather than the foot 84, carried by the side member 64, as shown in Figures 6 and 7.

While the invention has been described with particular reference to certain preferred embodiments, it is not intended to limit the scope of the invention to the embodiments shown, nor otherwise than by the terms of the following claims. The present application is a partial continuation of my application No. 571,394 filed Oct. 27, 1931.

I claim:

1. An adjusting device for shiftable-anchorage articulated brake shoes comprising an adjusting stud connecting the articulated ends of the shoes and floating with the shoes, a toothed wheel on the adjusting stud, a pinion meshing with the toothed wheel and which is mounted separately from the pinion and which does not float with the shoes, and a flexible connection for driving the pinion.

2. An adjusting device for brake shoes comprising an adjusting stud connecting and movable with the articulated ends of the shoes, a toothed gear on the stud, a pinion having a relatively broad face engaging the toothed wheel and mounted for rotary but not axial movement, and means for driving the pinion, extending to a readily accessible position.

3. An adjusting device for brake shoes comprising an adjusting stud connected between the articulated ends of the shoes, a toothed wheel on the stud, means for retaining the wheel in adjusted position, and a driving pinion having a relatively broad face engaging the toothed wheel, the pinion and said wheel being relatively shiftable lengthwise of the pinion teeth without changing the adjustment of said stud.

4. A brake comprising a backing plate, shoes positioned for movement thereon, an adjusting stud connecting the articulated ends of the shoes, a toothed wheel on the stud, a pinion positioned for rotation on the backing plate, engaging the toothed wheel, a flexible shaft for driving the pinion and a readily accessible handle on the backing plate for driving the shaft.

5. A brake comprising a backing plate, shoes positioned for movement thereon, an adjusting stud connecting the articulated ends of the shoes, a toothed wheel on the stud, a yoke supported by the stud, a pinion carried by the yoke, and a flexible shaft for driving the pinion.

6. A brake comprising a backing plate, shoes positioned for movement thereon, an adjusting stud connecting the articulated ends of the shoes, a toothed wheel on the stud, a yoke carried by the stud, a pinion supported by the yoke in mesh with the toothed wheel, and a flexible shaft for driving the pinion.

7. A brake comprising a backing plate, shoes positioned for movement thereon, an adjusting stud connecting the articulated ends of the shoes, a toothed wheel on the stud, means for retaining the toothed wheel in adjusted position, a yoke carried by the stud, means for supporting the yoke against rotation, a pinion on the yoke in mesh with the toothed wheel, and a flexible shaft for driving the pinion extended to an accessible position on the backing plate.

8. A brake comprising a backing plate, friction means mounted on one side of the backing plate and having wear-adjusting means movable as a unit with the friction means, and an actuating device for the wear-adjusting means mounted on the other side of the backing plate from the friction means and which is not movable with the friction means, the actuating device being arranged to operate the wear-adjusting means regardless of relative movement between the two.

9. A brake comprising a backing plate, friction means mounted on one side of the backing plate and having wear adjusting means movable as a unit with the friction means, and an actuating device for the wear-adjusting means mounted on the other side of the backing plate from the friction means and which is not movable with the friction means, the actuating device being arranged to operate the wear-adjusting means regardless of relative movement between the two, and which actuating device extends through the backing plate into operative engagement with the wear-adjusting means.

10. A brake comprising a backing plate having friction means mounted on one side thereof, and wear-adjusting means therefor including intermeshing gear members which are mounted respectively on opposite sides of the backing plate.

11. An adjusting device for brake shoes comprising an adjusting screw connecting the articulated ends of the shoes, a toothed wheel on the screw, a driving pinion in mesh with the toothed wheel, a yoke surrounding the toothed wheel and driving pinion, and manual means to actuate the driving pinion.

12. An adjusting device for brake shoes comprising an adjusting screw connecting the articulated ends of the shoes, a toothed wheel on the screw, a driving pinion in mesh with the toothed wheel, a yoke surrounding the toothed wheel and driving pinion, and manual means to actuate the driving pinion including a flexible shaft and an operating handle.

13. An adjusting device for brake shoes comprising an adjusting stud connecting the articulated ends of the shoes, a toothed wheel on the stud, a driving pinion in mesh with the toothed wheel, a yoke surrounding the toothed wheel and driving pinion, manual means to actuate the driving pinion, and means including projections carried by the yoke to prevent rotation of the yoke upon actuation of the driving pinion.

14. A brake including a backing plate, shoes movable relative to the backing plate, a turnbuckle connecting the articulated ends of the shoes, a toothed wheel on the turnbuckle, a driving pinion meshing with the toothed wheel, a stamping carried by the turnbuckle and enclosing the toothed wheel and the driving pinion, and means to prevent movement of the stamping upon actuation of the driving pinion.

15. A brake including a backing plate, shoes movable relative to the backing plate, a turnbuckle connecting the articulated ends of the shoes, a toothed wheel on the turnbuckle, a driving pinion meshing with the toothed wheel, a stamping carried by the turnbuckle and enclosing the toothed wheel and the driving pinion, and means including spaced projections carried by the stamping to prevent movement of the stamping upon actuation of the driving pinion.

16. A brake including a backing plate, shoes movable relative to the backing plate, a turnbuckle connecting the articulated ends of the shoes, a toothed wheel on the turnbuckle, a driving pinion meshing with the toothed wheel, a stamping carried by the turnbuckle and enclosing the toothed wheel and the driving pinion, means including a flexible shaft operably connected to the driving pinion, and means including spaced projections carried by the stamping to prevent movement of the stamping upon actuation of the driving pinion.

17. In a brake adjusting mechanism, a backing plate, shoes movable relative to the backing plate, an adjustable stud connecting the articulated ends of the shoes, a gear wheel fixed to the adjusting stud, a driving pinion meshing with the gear wheel, a housing engaging the adjustable stud and forming a support for the driving pinion, a flexible shaft connected to the driving pinion and projecting through the backing plate at a distance from the housing, and manual means to rotate the flexible shaft.

18. In a brake adjusting mechanism, a backing plate, shoes movable relative to the backing plate, an adjustable stud connecting the articulated ends of the shoes, a gear wheel fixed to the adjusting stud, a driving pinion meshing with the gear wheel, a housing engaging the adjustable stud, a spindle projecting through the housing to form a support for the driving pinion, a flange carried by the housing to support the spindle, a flexible shaft connected to the spindle and projecting through the backing plate at a distance from the housing, and manual means including a handle fixed to the flexible shaft to rotate the shaft.

19. In a brake adjusting mechanism, a backing plate, shoes movable relative to the backing plate, an adjustable stud connecting the articulated ends of the shoes, a gear wheel fixed to the adjusting stud, a driving pinion meshing with the gear wheel, a housing engaging the adjustable stud, a spindle projecting through the housing to form a support for the driving pinion, a flange carried by the housing to support the spindle, a flexible shaft connected to the spindle and projecting through the backing plate at a distance from the housing, means including spaced projections carried by the housing to prevent displacement of the housing upon actuation of the driving pinion, and manual means including a handle fixed to the flexible shaft to rotate the shaft.

A. P. THOMAS.